United States Patent [19]

Catchman et al.

[11] Patent Number: 4,717,373

[45] Date of Patent: Jan. 5, 1988

[54] APPARATUS FOR SEALING A HEM IN A MOVING WEB OF FILM USING ANGULARLY ORIENTED HOT WHEELS

[75] Inventors: Vernon C. Catchman, Palmyra; Fox J. Herrington, Holcomb, both of N.Y.

[73] Assignee: Mobil Oil Corporation, New York, N.Y.

[21] Appl. No.: 904,449

[22] Filed: Sep. 8, 1986

[51] Int. Cl.⁴ .................... B31B 23/64; B31B 23/86
[52] U.S. Cl. ............................ 493/193; 493/208; 493/225; 493/394; 493/928; 156/583.1; 156/583.4
[58] Field of Search .......... 493/205, 206, 207, 208, 493/209, 189, 190, 191, 192, 193, 197, 202, 225, 226, 381, 386, 394, 406, 470, 471, 928; 156/582, 583.1, 583.4, 583.7, 583.8, 583.9, 583.91

[56] References Cited

U.S. PATENT DOCUMENTS

| | | | |
|---|---|---|---|
| 2,242,799 | 5/1941 | Moore | 493/208 |
| 2,254,510 | 9/1941 | Bergstein | 493/193 |
| 2,660,219 | 11/1953 | Haas et al. | 493/197 |
| 2,762,271 | 9/1956 | Mead | 493/197 |
| 2,897,729 | 8/1959 | Ashton et al. | 493/196 |
| 2,971,874 | 2/1961 | Canno | 493/197 |
| 3,006,257 | 10/1961 | Orsini | 493/202 |
| 3,029,853 | 4/1962 | Piazze | 383/75 |
| 3,058,402 | 10/1962 | Kugler | 493/196 |
| 3,058,403 | 10/1962 | Kugler | 493/194 |
| 3,406,610 | 10/1968 | Golden | 493/196 |
| 3,414,032 | 12/1968 | Jortikka | 383/26 |
| 3,759,772 | 9/1973 | Andersson | 156/270 |
| 4,140,046 | 2/1979 | Marbach | 493/209 |
| 4,202,721 | 5/1980 | Roberts | 156/358 |

FOREIGN PATENT DOCUMENTS

| | | | |
|---|---|---|---|
| 2732085 | 1/1979 | Fed. Rep. of Germany | 156/583.1 |
| 2833119 | 2/1980 | Fed. Rep. of Germany | 156/583.1 |
| 1125363 | 8/1968 | United Kingdom | |

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

Apparatus for heat sealing a hem in a moving web of plastic film using a plurality of rollers or wheels mounted on a block at spaced locations for engaging the film along the path of a heat seal to be formed in the hem. The rollers are heated by contact of one of their sides against a heated block. The small force holding the rollers against the heated block is provided by a slight angular orientation of the roller relative to the direction of film travel.

9 Claims, 7 Drawing Figures

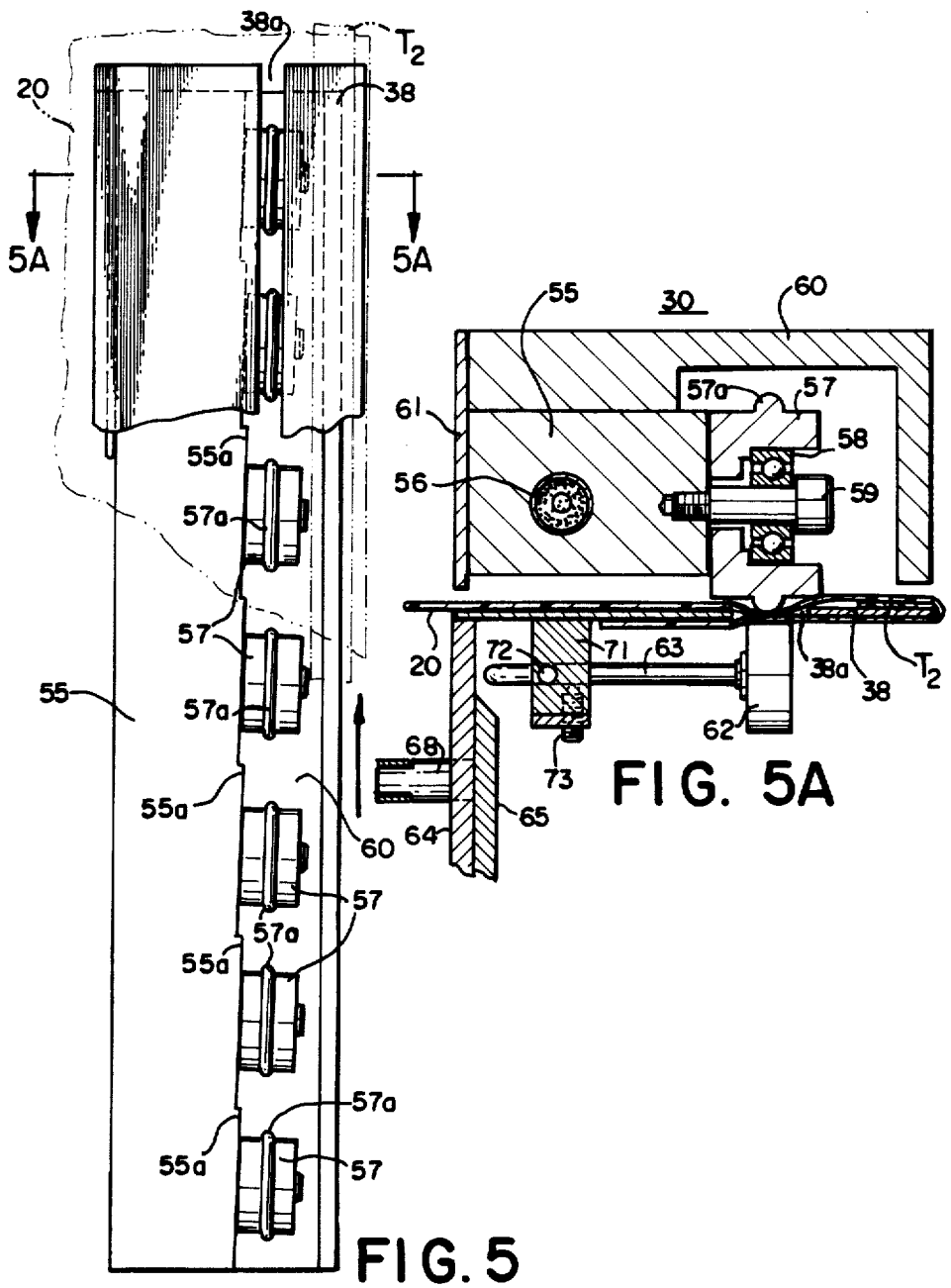

APPARATUS FOR SEALING A HEM IN A MOVING WEB OF FILM USING ANGULARLY ORIENTED HOT WHEELS

BACKGROUND OF THE INVENTION

This invention relates to apparatus for sealing a hem in a moving web of film using angularly oriented hot wheels and more particularly to the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed from the same polyethylene material. U.S. Pat. No. 3,029,853 - Piazzi and British patent 1,125,363 - Jortikka are examples of draw tape bags. Such closures have been successfully employed on these bags.

Draw tape closures for large trash bags, and the manufacture of these draw tape trash bags, are described in the related applications identified below.

Forming the hem, into which the tape is inserted, is shown for example, in U.S. Pat. Nos. 2,897,729 - Ashton et al 3,058,402 - Kugler, 3,058,403 - Kugler, and in copending patent applications of applicant's assignee including "METHOD AND APPARATUS FOR FORMING HEMS IN SUPERPOSED PLIABLE PANELS," Boyd et al, Ser. No. 652,255, filed Sept. 20, 1984, now U.S. Pat. No. 4,617,008, and in "HEM FOLDER WITH INTEGRAL TAPE INSERTER FOR MAKING DRAW TAPE BAGS," Herrington, Ser. No. 871,238 filed June 6, 1986

Draw tape hems have been previously made by various methods. One method is to use a Teflon-coated hot bar which opens and closes against the film in the area of the bag machine where the film starts and stops. The bar closes once during each cycle while the film is stopped. A second method is to blow a series of hot air jets against the film as it travels by. Bag closures for use in the field use a pair of heated belts to produce a machine-direction seal. In the hot bar method, the hot bar is located far downstream from where the tape is inserted into the hem and also where the hem is folded, so there has been an opportunity for the tape and the hem to wander by the time it reaches the sealer. This requires making the hem wider to allow for this wandering movement. This is costly in wasted material, produces a weak tape seal at the side edges of the bag, and also makes a sloppy bag. The hot air sealer can be used on a continuously moving web, but it is very sensitive to wrinkles. The heating of the film by the air jets also causes some wrinkling which cannot easily be prevented since the film is not mechanically constrained. As a result the hem seals made by these techniques are not reliable, particularly where thin films, in the order of one mil, are used.

It is an object of the present invention to seal a hem in a web of film moving at a relatively high speed, such as 250–300 ft./min, where the seal in the hem is produced as close as possible to where the hem is folded and the tape inserted, using angularly oriented hot wheels. The wheels or rollers are heated by contact of one of their sides against a heated block. The small force holding them against the heated block is provided by a slight angular orientation of the wheel relative to the direction of film travel.

It is a further object of the present invention to seal hems in the opposing panels of a moving web of folded thermoplastic film in the manufacture of draw tape bags.

RELATED APPLICATIONS

METHOD AND APPARATUS FOR MANUFACTURING DRAW TAPE BAGS, Boyd, et al, Ser. No. 652,254, filed Sept. 20, 1984, now U.S. Pat. No. 4,624,654, describes an overall draw tape bag manufacturing line; METHOD AND APPARATUS FOR FORMING HEMS IN SUPERPOSED PLIABLE PANELS, Boyd et al, Ser. No. 652,255, filed Sept. 20, 1984, now U.S. Pat. No. 4,597,750, describes a hem forming apparatus used with the line; INSERTION OF DRAW TAPE STRIPS IN DRAW TAPE BAG MANUFACTURE, Boyd et al, Serial No. 652,252, filed Sept. 20, 1984, now U.S. Pat. No. 4,597,750, describes apparatus for inserting a draw tape into the bag; HEM FOLDER WITH INTEGRAL TAPE INSERTER FOR MAKING DRAW TAPES, Herrington, Ser. No. 871,238 filed June 6, 1986, describes apparatus for folding a hem and inserting a draw tape into the bag. APPARATUS FOR SEALING A HEM IN A MOVING WEB OF FILM, Herrington, Ser. No. 904,441 filed concurrently herewith describes apparatus for heat sealing a hem; APPARATUS FOR PRODUCING A MACHINE-DIRECTION HEAT SEAL, Herrington, Ser. No. 904,444 filed concurrently herewith. The foregoing applications are incorporated herein by reference thereto.

SUMMARY OF THE INVENTION

In accordance with the present invention the apparatus for making a hem in a moving web of plastic film comprises a block adapted to be supported on one side of the hem, a plurality of rollers mounted on the block at spaced locations for engaging the film along the path of the heat seal to be formed in the hem, the block having a corresponding plurality of surfaces each of which is engaged by a side of one of the rollers, each of the surfaces being slightly angled with respect to the path of movement of the plastic film and the path of the heat seal, and means for heating the plurality of surfaces whereby movement of the hem through the heat sealing apparatus causes the plurality of rollers to rotate and maintain contact with the plurality of surfaces whereby the rollers are in turn heated by conduction from the block. A plurality of back-up rollers are supported on the opposite side of the hem for engaging the film along the path of the heat seal to be formed in the hem and cooperating with the heated rollers in creating the heat seal in the hem. The foregoing apparatus preferably is incorporated in a machine for making bags from thermoplastic film wherein two heat sealing units of the above-described type are utilized, one for heat sealing the hem in the front of the bag and the other sealing the hem in the back of the bag.

The foregoing and other objects, features and advantages of the invention will be better understood from the following, more detailed description and appended claims.

SHORT DESCRIPTION OF THE DRAWINGS

FIG. 5 is a view of the hem sealing apparatus shown in FIG. 4 taken along the lines 5—5; and FIG. 5A is a cross-sectional view taken along the lines 5A—5A in FIG. 5.

DESCRIPTION OF THE SPECIFIC EMBODIMENT

Figure 1:
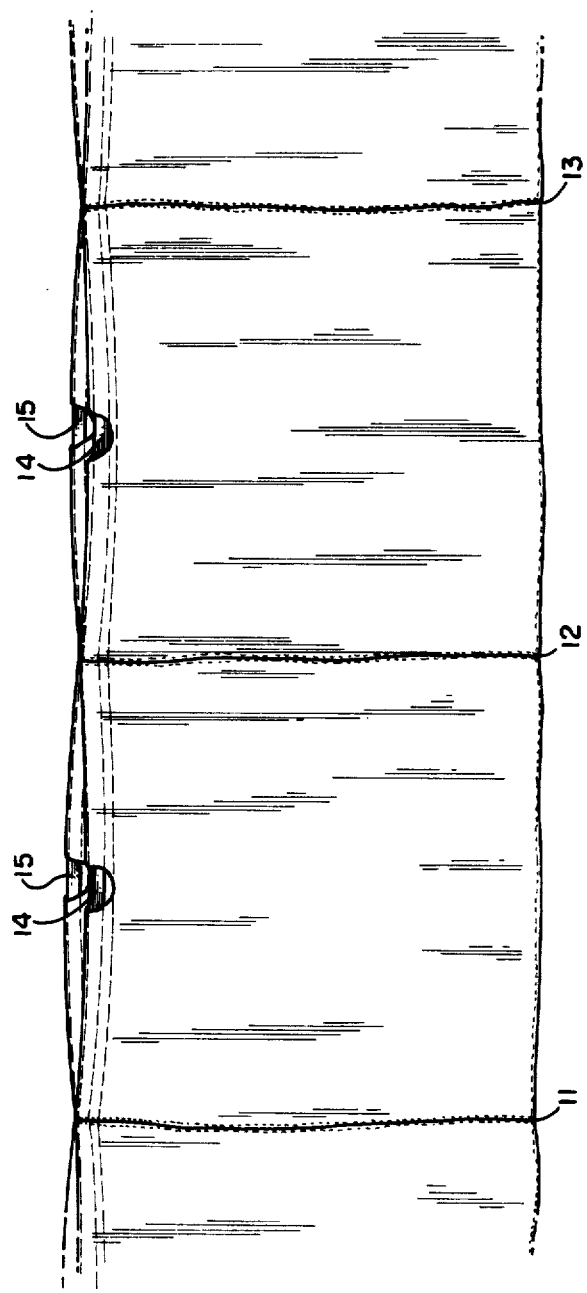
FIG. 1 shows a series of draw tape bags made in accordance with the present invention.

FIG. 1 shows a series of draw tape bags formed from an extruded tube of polyethylene. The tube is slit along one side to form open tops in the bag for reception of trash and the like. The tube of film is folded along the other side to form the bag bottoms. The sides of the panels are heat sealed and cut from the tube in a perpendicular direction at 11, 12 and 13 to form individual bags.

Hemmed portions of each opposing panel are folded over adjacent the top. Draw tapes 14 and 15 are inserted in the hems and are secured by the heat seal at the sides of the panels. Tape holes are cut in each panel exposing the draw tape so that they can be grasped. The distance from the bottom of the bags to the top is referred to as "web width" or "bag length" herein.

Figure 2:
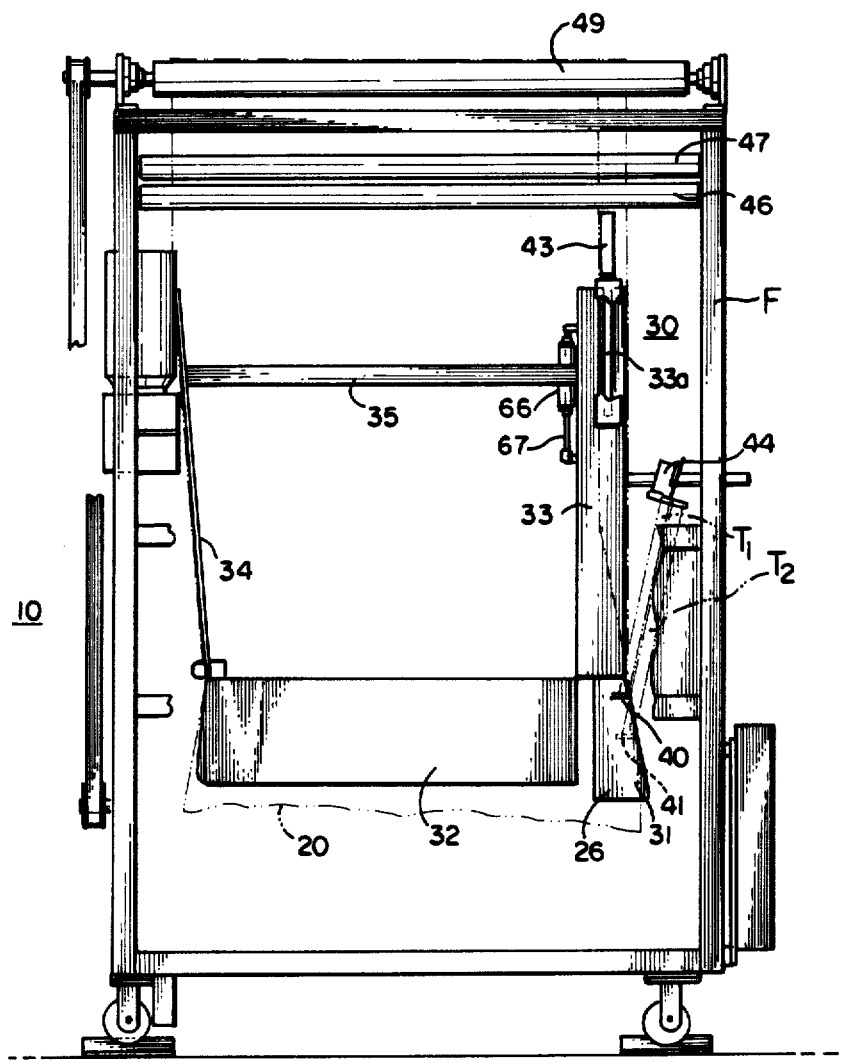
FIG. 2 is a side elevation view of a machine embodying the hem sealing apparatus of the present invention.
Figure 3:
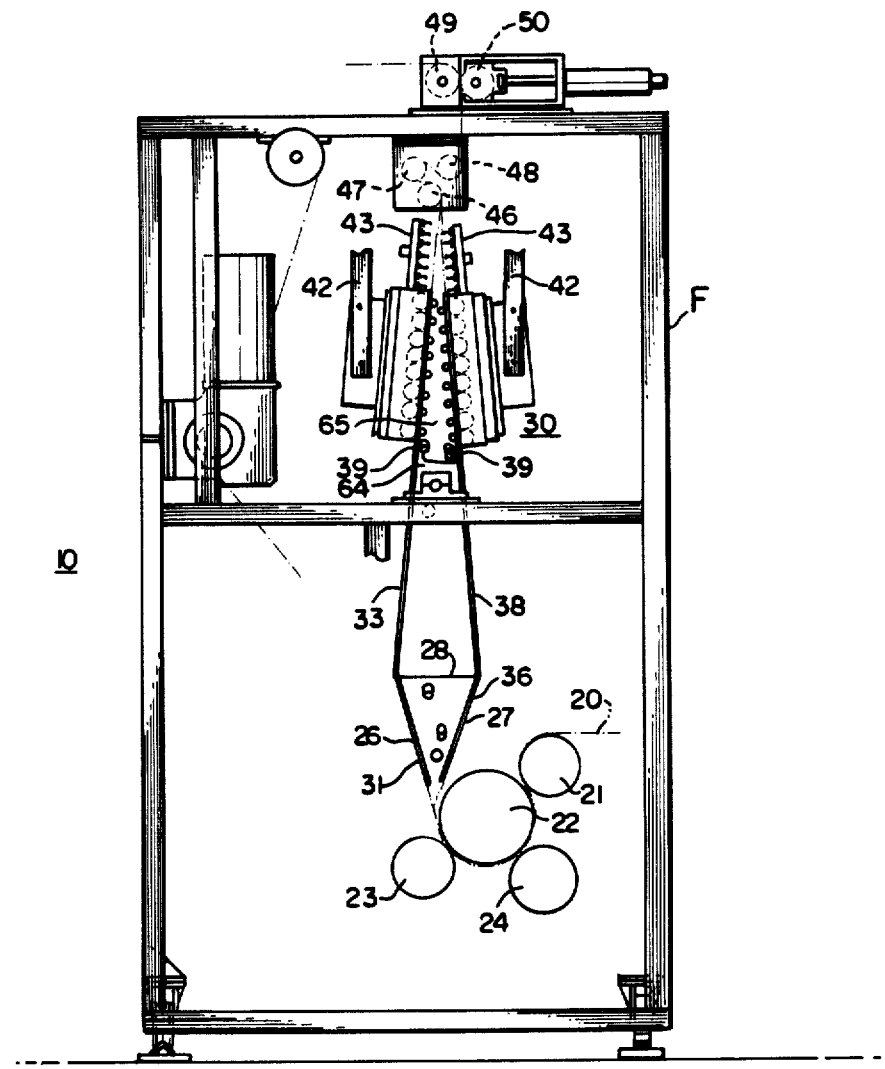
FIG. 3 is a front elevation view of the machine of FIG. 2.

FIGS. 2 and 3 illustrate a machine 10 embodying the apparatus of the present invention for sealing a hem in a moving web of film. A moving web of film 20 is formed from an extruded tube of polyethylene which has been slit on the side facing the viewer in FIGS. 3 and 4 and folded on the other side to form two opposing layers of film. This moving web 20 enters the machine 10 through rollers 21, 22, 23 and 24, with the roller 24 having punch elements which form the holes for grasping the tape.

Figure 4:
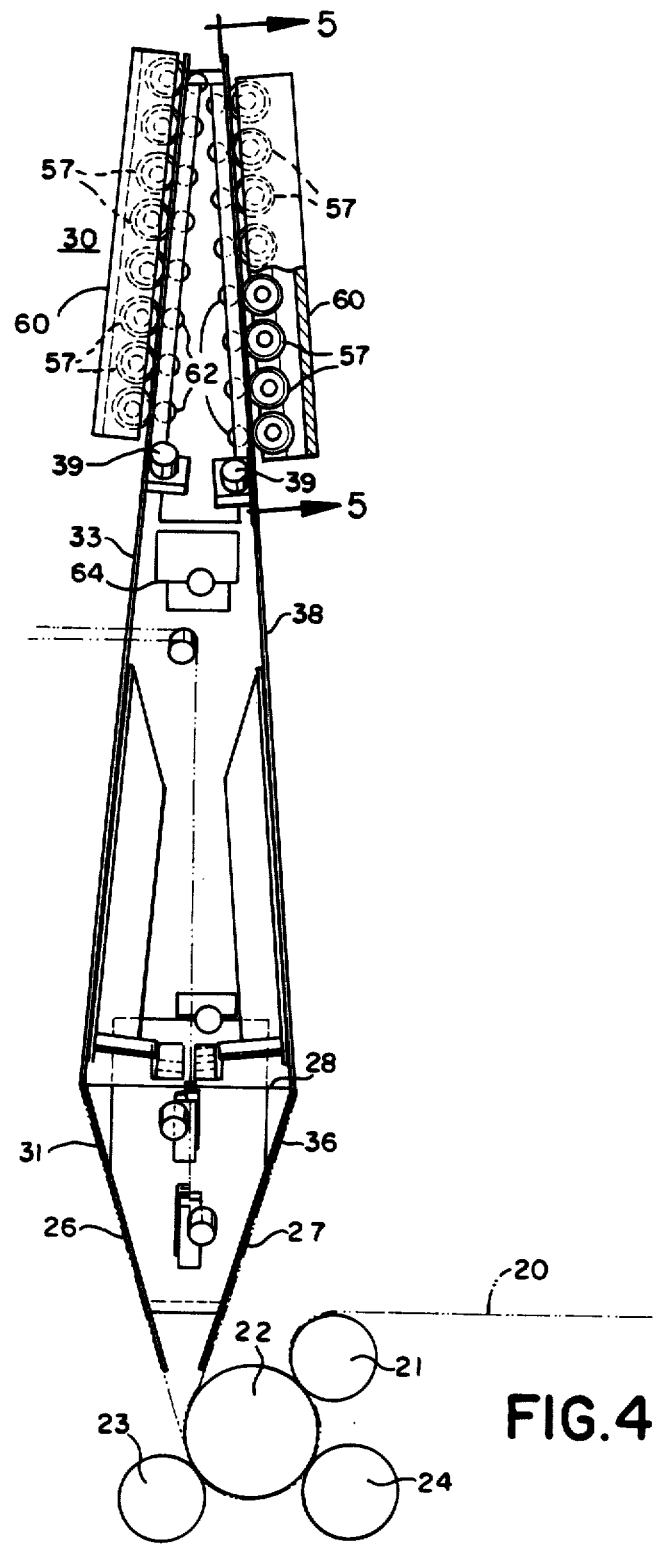
FIGS. 4 and 4A are front and rear elevation views on enlarged scale of the hem sealing apparatus shown in FIG. 3.

The hem forming apparatus illustrated in FIGS. 2–4 includes structure having two folding surfaces 26 and 27 which are flat and converge outwardly from the feed rolls 21-24 to a point of maximum separation at 28 and then converge inwardly to a point of close separation adjacent the hem sealing apparatus 30. The folding surface 26, FIG. 2, is made up of a lower hem plate 31, a lead-in plate 32, an upper hem plate 33 and the edge of a bottom plate 34 which is separated from the upper hem plate 33 by a spacer 35 and the lead-in plate 32. The lead in plate 32 and the lower hem plate 31 are both in the same plane and diverge outwardly to the point 28 as shown in FIGS. 3 and 4. The other surface 27 includes a lower hem plate 36, a lead in plate similar to plate 32 and in the same plane as plate 36, an upper hem plate 38 and the opposite edge of the bottom plate 34, FIGS. 4 and 4A. The bottom plate 34, FIG. 4A, is triangularly shaped having its base along the line 28 in FIGS. 3, 4 and 4A and its apex adjacent the upper end of the hem plates 33 and 38.

Figure 4A:
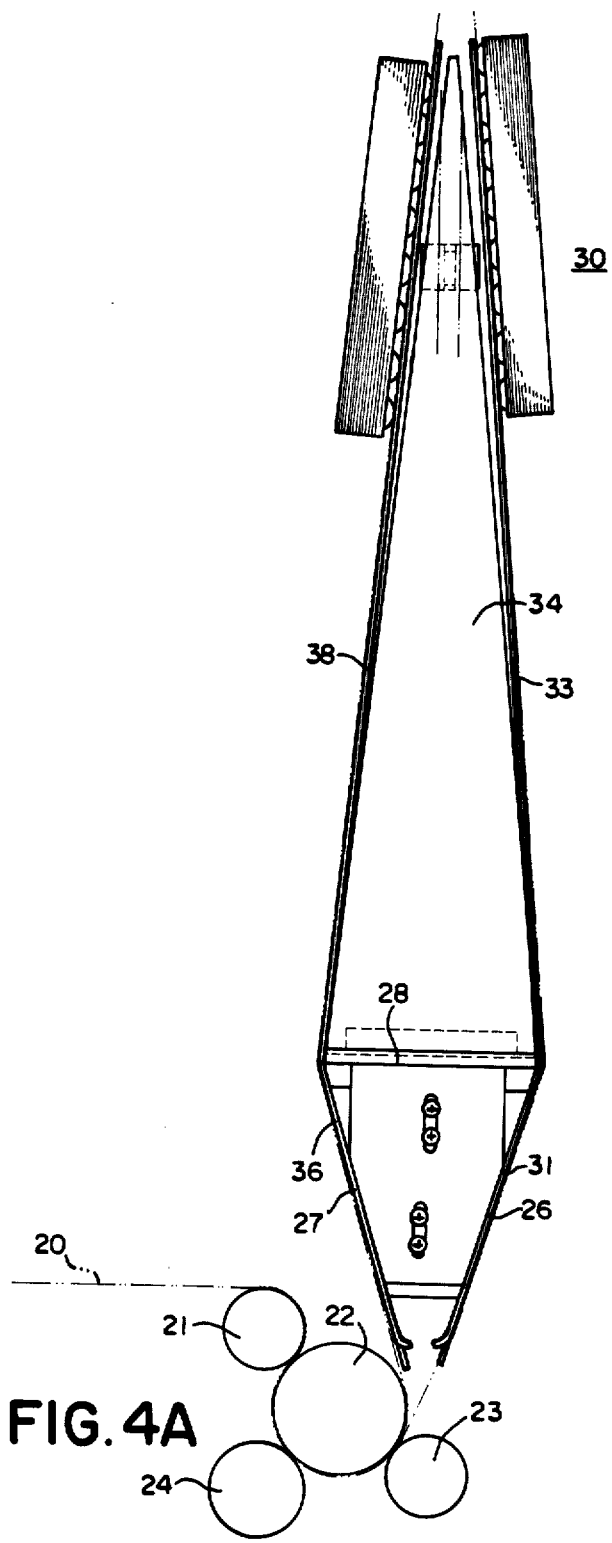

When the web impinges on the surfaces 26 and 27, FIGS. 3, 4 and 4A, the folded edge of the web 20 which is to form the bottom of the bags will pass over the bottom plate 34 as shown in FIG. 2. A layer of the film passes over the outside of each of the surfaces 26 and 27 and the split edges of the film are tucked onto the other side of each surface to produce a hem in each opposing layer of film. The rollers 39, FIGS. 3 and 4, supported in relation to the hem plates 33 and 38 maintain the moving web of film tightly around the respective surfaces 26 and 27 and against the opposite sides thereof to avoid formation of wrinkles in the film during the heat sealing of the hems, FIGS. 3 and 4.

Slots 40 and 41, FIG. 2, in the lower hem plates 31 and 36, receive the tapes T1 and T2 which are inserted into the hems of the moving web of film. A tape splitter 44 produces the two tapes T1 and T2 from a single tape. The hem sealing apparatus 30 which is supported from the frame F by adjustable brackets 42, FIG. 3, seals the folded over hem portion to the side panel of the bag so that the draw tape is secured in the hem of the bag. After the heat sealed hems leave the hem sealing apparatus 30 they pass between cooling members 43 which comprise a plurality of air jets for directing air against the heat sealed areas of the seams so as to prevent stretching of the film as it passes through nip rolls 46–48 and then through rolls 49 and 50 to the further processing steps of side sealing and cutting into individual bags. The present invention is concerned with the improved apparatus for sealing a hem in a moving web of film while the web is moving and preferably prior to the hem leaving the hem folding surface.

As shown in FIG. 2 the upper hem plate 33 has an opening in the form of a longitudinal slot 33a therein near the upper end of the plate. The other hem plate 38 has a similar opening or slot therethrough and both of these openings are positioned in alignment with the heat sealing apparatus 30. The heat sealing apparatus 30 comprises two similar sealing units, supported from the frame F by adjustable brackets 42, one mounted relative to each of the upper hem plates 33 and 38, FIGS. 2–4A. The adjustable brackets 42 are adapted to be moved between an inoperative position and an operating position in FIG. 3 by means of actuators, not shown, in the form of air cylinders. When the brackets 42 are in the operating position, the respective sealing units of the heat sealing apparatus 30 are in foxed position with respect to the upper hem plates 33 and 38 as shown in FIG. 3. This is the normal operating position for the heat sealing units during the manufacture of the draw tape plastic bags. After the heat sealed hems leave the heat sealing apparatus 30 they pass between cooling members 43 which comprise a plurality of air jets for directing cooling air against the heat sealed areas of the seams to cool the seams so as to prevent stretching of the film as it passes through rolls 46–50 to the further processing steps of side sealing and cutting into individual bags. The details of the heat sealing apparatus 30 are best seen in FIGS. 5 and 5A where they are illustrated in connection with the hem plate 38.

As may be seen in FIG. 5A the heat sealing apparatus 30 includes a heating block 55 through which extends an electric heating element 56 which preferably is thermostatically controlled to control the temperature of the block 55. The block 55 is provided with a plurality of slightly angled surfaces 55a, FIG. 5, which surfaces are slightly angled with respect to the path of movement of the plastic film and the path of the heat seal. Extending from the surfaces 55a are a corresponding number of rollers or wheels 57 which in turn are mounted on ball bearings 58 which in turn are mounted on shoulder screws or shafts 59, the threaded ends of which extend through the corresponding faces 55a and are secured to the block 55. Each of the rollers 57 is provided with an annular projection or rim 57a the purpose of which will be hereinafter described. The heater block 55 and the rollers 57 are mounted within a housing 60 having an end plate 61. The housing 60 is mounted with respect to the hem plate 38 such that the projections 57a on the wheels 57 are in alignment with an extend into the slot 38a on the hem plate 38. Mounted at the opposite side of the hem plate 38 and in alignment with the slot 38a is a plurality of rubber rollers 62, one being shown in FIG. 5A, which are spring biased and are adapted to extend into the slot 38a and cooperate with the rollers 57 in heat sealing the hem in the web.

As may be seen in FIGS. 3 and 4 the hem plates 33 and 38 are maintained in spaced relation by a plate 64 on which is mounted an adjustable wedge 65 which is adapted for vertical movement by an air cylinder 66, FIG. 2. The air cylinder 66 is mounted on the plate 64. The opposite ends of a rod 67 in the air cylinder are connected to the wedge 65. When the air cylinder 66 is actuated, the plunger 67 may move the wedge 65 vertically a predetermined distance. As may be seen in FIG. 5A the sides of the wedge 65 are beveled and adapted to engage the ends of the shafts 63 which carry the rollers 62. The shafts 63 are carried by pivots 70 which in turn are carried by blocks 71 secured to the hem plates, as illustrated by hem plate 38 in FIG. 5A. The blocks 71 also are provided with spring loaded detents 73 which engage the shafts 63 for the rollers 62. The spring loaded detents are adjustable so as to vary the amount of spring loading on the shafts 63. When the wedge 65 is moved upwardly from its position shown in FIGS. 3 and 4, the wedge engages the ends of the shafts 63 causing the rollers 62 to be moved out of engagement with the web and thus out of the slot 38a as shown in FIG. 5A. While the forgoing arrangement has been described in connection with the hem plate 38, it is to be understood that similar parts both for the heated rollers 57 and the rubber backup rollers 62 are utilized in connection with the other hem plate 33.

By the time the web of film 20 has moved upwardly over the folding surfaces 26 and 27, FIGS. 4 and 4A, the layer of the film moving over the surface 27 will have moved onto the folding plate 38 where the film is folded around the edge of the plate 38 to form a hem with a tape T2, FIG. 5A inserted therein as previously described. When the hem reaches the lower end of the sealing apparatus 30, FIGS. 4 and 5, the projections 57a on the heated rollers 57 cooperate with the spring biased rubber rollers 62 to engage the opposite sides of the hem and form a heat seal longitudinally of the web.

The wheels 57 are heated by means of conduction from the heater block 55, the temperature of which is thermostatically controlled by the heating element 56, FIG. 5A. As illustrated in FIG. 5 each of the rollers 57 is mounted against a slightly angled surface 55a so that when they rotate in cooperation with the rubber backup rollers 62, they assist in maintaining a straight path of movement for the hem and thus insure a straight hem seal as the web moves through the sealing apparatus 30. Also by using a plurality of heat sealing rollers or wheels 57, the heat required for sealing the hem can be delivered to the film in smaller increments since eight wheels are supplying the heat rather than one. A further advantage of mounting the wheels 57 on the slightly angled surfaces 55a is that a slight bias force is produced in the direction of movement of the film such that the wheels are heated by contact of one of their sides against the heated block and the force holding them against the heated block is provided by the slight angled orientation of the wheels relative to the direction of film travel. It is this small force that assures contact between each wheel 57 and heated block 55 to ensure heat transfer into the wheel.

It has been determined by calculation that the creation of a seal 3/16" wide at 300 ft./min. on two layers of 1.3-mil film requires the transfer of 7 Btu/min of heat into the film This same amount of heat must likewise be transferred from the heated block into the wheel. This cannot readily be done by hot air or by transfer through the bearings of the wheel. In the embodiment described hem seals were made at about 300 ft/min. speed using 8 wheels, 1-½" diameter, in tandem, heated to a temperature of 300–350° F. The wheels were hard anodized aluminum having Teflon coated surfaces on the rims 57a and the sides of the wheels 57 which engage the Teflon coated surfaces 55a on the aluminum block 55. The rims 57a had a radius of 3/32". The 8 backup wheels were ⅜" diameter, 40-durometer natural rubber rollers, although silicone rubber may be preferred for durability. Since two hems are being sealed simultaneously (one for the front and one for the back of the bag) and since it is desirable to separate the layers of film as little as possible, the ⅜" backup rolls 62 are alternated inside the opening between film layers, FIG. 4, so that every other roll 62 is used as the backup for the hot wheels sealing the front of the bag, and alternate wheels are used for backup for the hot wheels 57 sealing the back of the bag. In that way, it is only necessary to separate the film layers by just over ⅜". While a flat anvil backup means may be used in cooperation with the heated rollers, it has been found that the individual rubber rollers provides smoother seals.

While the present invention has been described in connection with a bag making machine of the type disclosed in the present application, it is to be understood that the hem sealing apparatus embodying the present invention may be utilized in other bag making machines and in other applications for sealing a hem in a moving web of film.

What is claimed is:

1. Apparatus for producing a machine-direction heat seal in opposing layers of thermoplastic film in a hem in a moving web of thermoplastic film, comprising:

a block supported on one side of the hem, a plurality of rollers mounted on said block at spaced locations in tandem in the direction of web movement for engaging one of the opposing layers of film of the hem along the path of the hem in the direction of web movement, said block having a corresponding plurality of surfaces each of which is engaged by a side of one of said rollers, each of said surface being slightly angled with respect to the path of the hem in the direction of web movement, means for heating said block and its plurality of surfaces, and a plurality of shafts corresponding with said plurality of rollers, said shafts projecting from said corresponding plurality of angled surfaces of said block and supporting said rollers for free rotation about their axes with said one side thereof engaging said angled surfaces to provide a corresponding angled orientation of the axes of said rollers relative to the direction of web movement, whereby movement of the web through the heat sealing apparatus causes said plurality of rollers to rotate and the angled orientation of the axes thereof produces a force holding said rollers in contact with said plurality of angled surfaces whereby said rollers are in turn heated by conduction from said heated block.

2. Apparatus according to claim 1 including means supported on the opposite side of the hem for engaging the other opposing layer of film of the hem along the path of the hem in the direction of web movement and cooperating with said rollers in creating the heat seal in the hem.

3. Apparatus according to claim 2 where said rollers are each provided with a rim projecting radially from each roller and said rim having a width corresponding to the width of the heat seal in the hem.

4. Apparatus according to claim 3 wherein said means supported on the opposite side of the hem comprises a plurality of back-up rollers cooperating with said plurality of heated rollers on said block for producing the heat seal in the hem.

5. Apparatus according to claim 4 wherein said plurality of back-up rollers are each provided with a rubber surface for cooperating with said rim on said heated rollers.

6. In a machine for making bags from thermoplastic film, apparatus for heat sealing opposing layers of film in a pair of hems in a moving web of thermoplastic film, comprising:

a first block supported on one side of one of the hems, a plurality of first rollers mounted on said first block at spaced locations in tandem in the direction of web movement for engaging one of the opposing layers of film of the first hem along the path of the first hem in the direction of web movement said first block having a corresponding plurality of surface, each of which is engaged by a side of one of said first rollers, each of said surfaces being slightly angled with respect to the path of the first hem in the direction of web movement, a second block supported on one side of the second hem, a plurality of second rollers mounted on said second block at spaced locations in tandem in the direction of web movement for engaging one of the opposing layers of film of he second hem along the path of the second hem in the direction of web movement, said second block having a corresponding plurality of surfaces each of which is engaged by a side of one of said second rollers, each of said surfaces on said second block being slightly angled with respect to the path of the second hem in the direction of web movment, means for heating each of said blocks and their respective plurality of surfaces, a plurality of first shafts corresponding with said plurality of first rollers, said plurality of first shafts projecting from said corresponding plurality of surfaces of said first block and supporting said plurality of first rollers for free rotation about their axes with said one side thereof engaging said angled surfaces of said first block to provide a corresponding angled oriention of the axes of said first rollers relative to the direction of web movement, and a plurality of second shafts corresponding with said plurality of second rollers, said plurality of second shafts projecting from said corresponding plurality of surfaces of said second block and supporting said second rollers for free rotation about their axes with said one side thereof engaging said angled surfaces on said second block to provide a corresponding angled orientation of the axs of said second rollers relative to the direction of web movement, whereby movement of the web in the heat sealing apparatus causes the pluralities of first and second rollers to rotate and the angled orientations thereof produce a force holding said plurality of first rollers in contact with said plurality of angled surfaces on said first block and produce a force holding said plurality of second rollers in contact with said plurality of angled surfaces on said second block whereby said plurailities of first and second rollers are in turn heated by conduction form the respective heated first and second blocks.

7. Apparatus according to claim 6 including means supported between the pair of hems for engaging the other opposing layers of film of the first hem and the second hem along the paths of the hems in the direction of web movement and cooperating respectively with said first rollers on said first block and said second rollers on said second block in creating the heat seals in the hems.

8. Apparatus according to claim 7 wherein said means supported between said pair of hems comprises a plurality of back-up rollers cooperating with said plurality of heated rollers on said blocks for producing the heat seals in the hems.

9. Apparatus according to claim 8 wherein said back-up rollers are alternated so that every other back-up rollers is used as the back-up for the heated rollers sealing the hem on the front of the bag and alternate back-up rollers are used for the back-up of the heated rollers sealing the hem on the back of the bag to minimize the separation distance between the hems during the heat sealing operation.

* * * * *

UNITED STATES PATENT AND TRADEMARK OFFICE
CERTIFICATE OF CORRECTION

PATENT NO. : 4,717,373

DATED : January 5, 1988

INVENTOR(S) : Vernon C. Catchman et al.

It is certified that error appears in the above-identified patent and that said Letters Patent is hereby corrected as shown below:

Column 2, line 16, "4,597,750" should be --4,617,008--.

Column 6, line 7, following "film" insert --.--.

Column 8, line 17, delete "axs" and insert --axes--.

Signed and Sealed this

Twenty-eighth Day of June, 1988

Attest:

DONALD J. QUIGG

Attesting Officer　　　　　Commissioner of Patents and Trademarks